Jan. 17, 1967   K. C. RUBINWITCH   3,298,246
MECHANICAL PROGRAMMING DEVICE
Filed Feb. 2, 1965   2 Sheets-Sheet 1

INVENTOR.
KENNETH C. RUBINWITCH
BY White & Haefliger
ATTORNEYS.

United States Patent Office 3,298,246
Patented Jan. 17, 1967

3,298,246
MECHANICAL PROGRAMMING DEVICE
Kenneth C. Rubinwitch, Long Beach, Calif., assignor to Purex Corporation, Ltd., Lakewood, Calif., a corporation of California
Filed Feb. 2, 1965, Ser. No. 429,776
10 Claims. (Cl. 74—568)

This invention has to do with improvements in mechanical programming devices or controls operable to produce response of an actuator to relative movement of a control having accurately predeterminable shape characteristics which govern or program the actuator response. This type of device has capabilities for various uses in conjunction with equipment controllable in response to the programmed actuator movements, which in turn program the equipment operations, as will be appreciated by those familiar with the control arts.

Mechanically, the invention is primarily concerned with an improved cam-type programming device characterized by its capacity for variability to accurately control any of various conditions subject to modification in a given operation, or to serve the requirements of different kinds of operations to be programmed or controlled.

The invention is predicated upon the use of an extended flexible rubber member presenting a cam surface serving as the primary programming control, and which is engaged by a follower which becomes the actuator or responsive control for an operation or mechanism with which the actuator may be associated.

One of my primary objects is to achieve in and by virtue of the rubber cam a capacity for variability approaching infinite conformability to different cam surface configurations that may be required for different programming of demanding accuracies.

In accordance with the invention, this objective is achieved by utilization of a flexible rubber cam most usually in annular form, within which is embedded a sequence of inserts which are subject to virtually infinitely variable relative displacement to correspondingly flex the rubber and shape its cam surface.

In a preferred embodiment of the invention the rubber annulus is mounted in spaced relation to a support carrying screw elements threaded into the rubber embedded inserts and individually adjustable to accurately shape and maintain the cam surface to predetermined configuration. Both close control of the rubber deformation and maintenance of an exact cam shape, are made possible by forces and resistances applied internally of the rubber by the embedded inserts.

All the various features and objects of the invention, as well as the details of an illustrative embodiment, will be more fully understood from the following detailed description of the accompanying drawings, in which.

Figure 1:
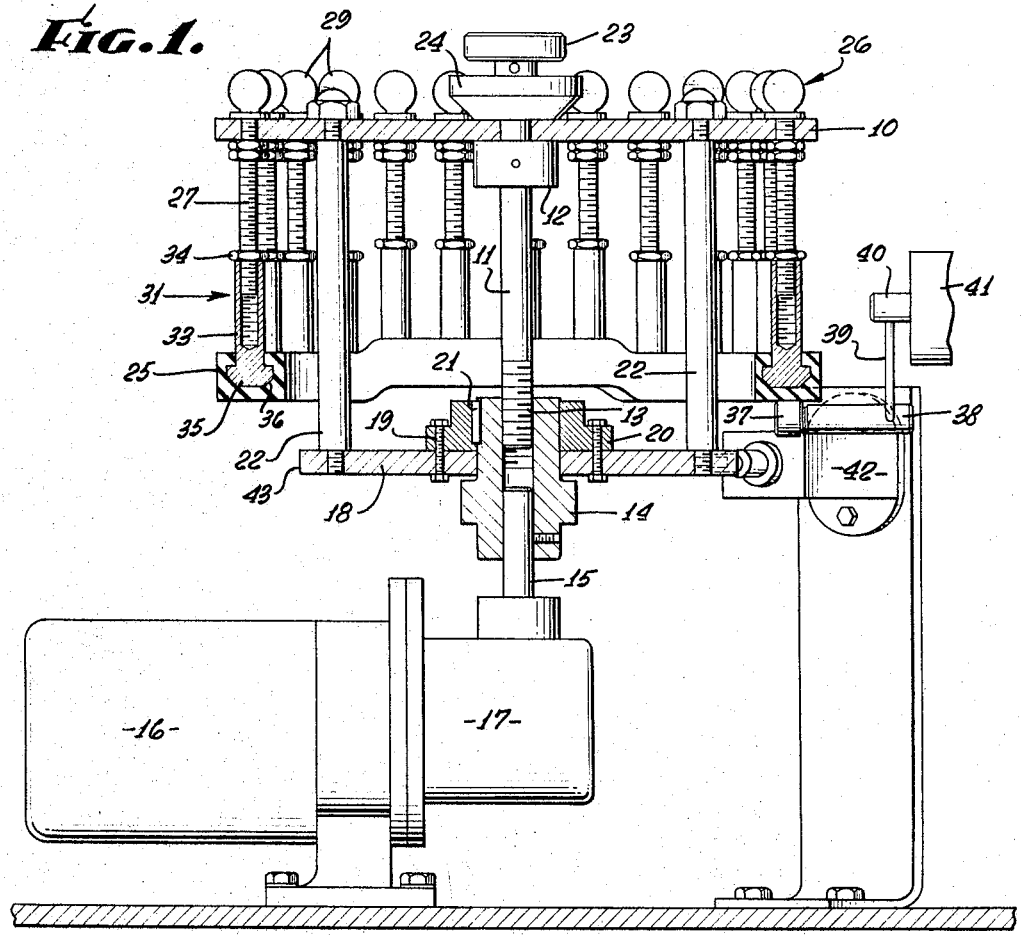
FIG. 1 shows the programming device in elevation, the flexible cam and associated mounting structure appearing in vertical section.
Figure 2:
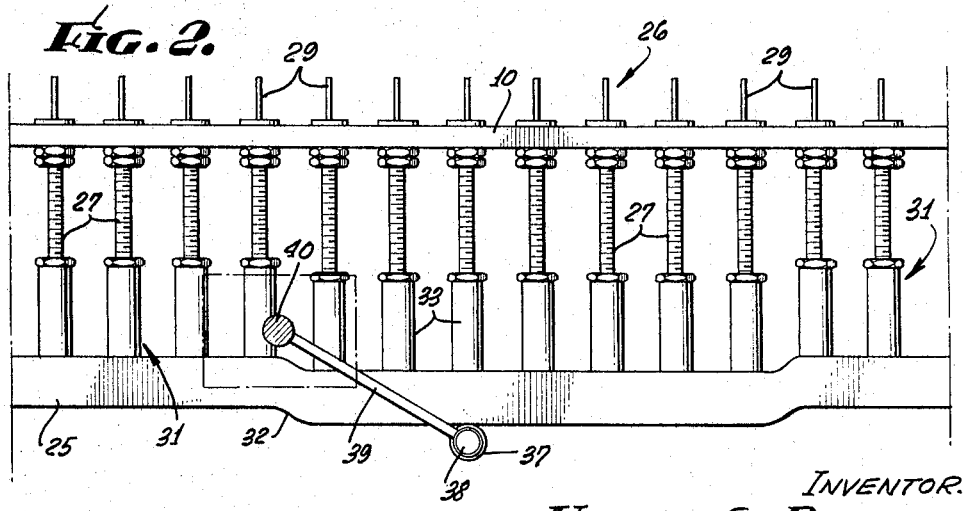
FIG. 2 is a view taken for illustration of the adjustment series by representation in linear sequence.
Figure 3:
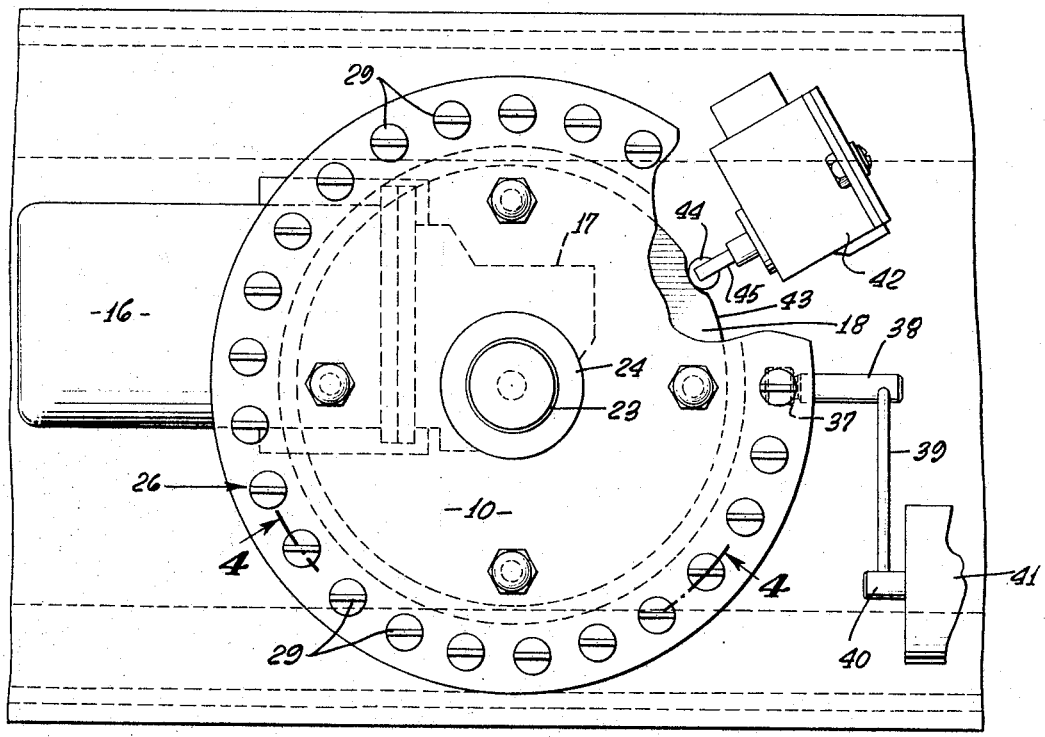
FIG. 3 is a plan view of FIG. 1.

In reference first to FIGS. 1 and 3, the device is shown to comprise a horizontally oriented rotatable support in the form of a disc 10 carried by shaft 11 upon sleeve 12, the shaft being threaded at 13 into the hub 14 which receives a spindle 15 rotatably driven by motor 16 through an appropriate speed reducer 17. The hub 14 carries a disc 18 attached by screws 19 to ring 20 keyed at 21 to the hub 14 so as to permit vertical displacement of the disc and ring relative to the hub. Discs 10 and 18 are interconnected by bolts 22 and shaft 11 carries a manually rotatable head 23 above lock nut 24 threaded to the shaft so that upon loosening of the lock nut the shaft may be rotated to raise or lower the assembly carried by plates 10 and 18 relative to the hub 14 as permitted by the threaded reception at 13 of the shaft within the hub.

Figure 4:
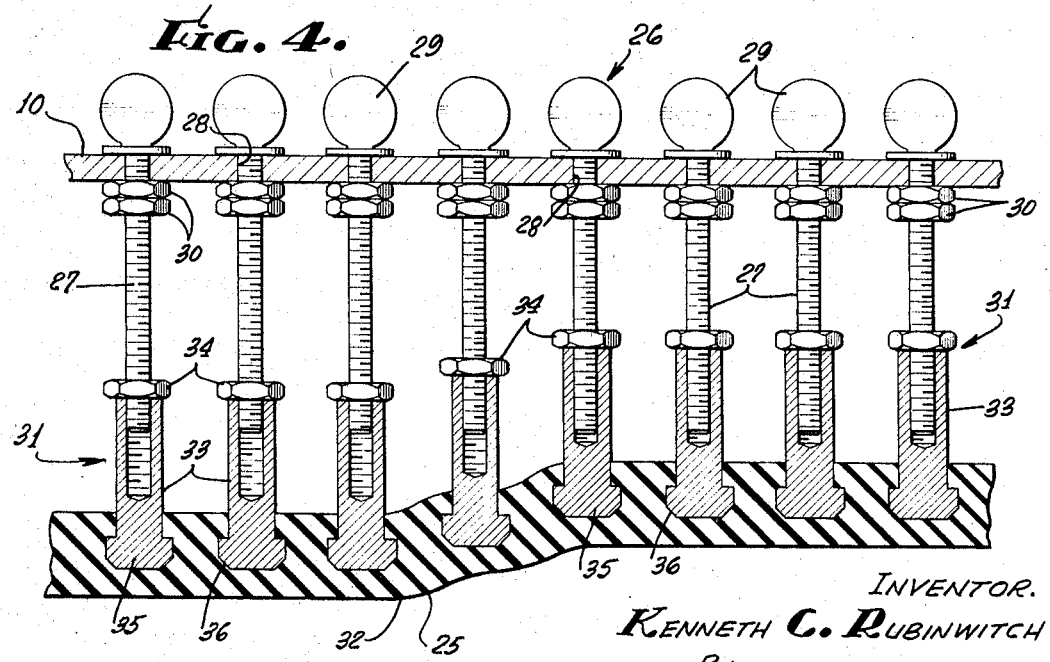
FIG. 4 is a sectional view similar to FIG. 2 in being a representation linearly of a portion of the cam and adjustment series corresponding to line 4—4 of FIG. 3.

An annular cam 25, see particularly FIG. 4, is suspended from the disc 10 by a series of cam adjustments individually generally indicated at 26. Each adjustment comprises a screw 27 extending at 28 through the disc 10 and having a wing head 29 that may be manually rotated to rotate the screw upon loosening of the lock nuts 30. The rubber cam 25 has embedded therein a succession of inserts 31 at intervals that may be spaced as closely together as may be necessary to obtain a desired accuracy of shape to the bottom cam surface 32 of the rubber annulus 25. Each insert 31 is shown to comprise an elongated nut 33 into which the screw 27 is threaded below lock nut 34, the nut having a head 35 embedded in the rubber and extended beyond the nut shank diameter to provide for correspondingly extended bearing and force distribution or assumption within the rubber. As illustrated, each head 35 may be given a degree of taper at 36 so that forces imparted to or received from the rubber will tend to distribute not only axially but outwardly of the nut, thereby to impart and maintain greater precision in the shape of the cam surface 32 at any and all locations.

As will be understood, the function of the cam is to permit predetermined programming of the operation of a device, mechanism or instrumentality to be controlled, in response to following of the cam surface 32 during its rotation. For very accurate programming it is of course essential that corresponding accuracy be present and maintainable in the shape of the cam surface 32. The invention permits such accuracy to a high degree by reason of the fact that the cam rubber is adequately flexible for close fidelity, and is accurately controllable and maintainable by reason of the accommodation of the inserts 31 within the body of the rubber at intervals necessary for precise shape conformance and maintenance. The composition of the rubber, for example, neoprene, may be selected to maximize the combined properties of flexibility, maintainability of the cam surface shape, and resistance of the surface to wear by the follower.

As illustrative, the follower is shown to comprise a roller 37, see FIG. 1, on the terminal 38 of an oscillatory arm 39 shown illustratively to be carried by the shaft 40 of any responsive device, diagrammatically indicated at 41, whose operation is controllable by oscillation of the shaft. Various kinds of mechanisms or instrumentalities responsive to or controllable in accordance with the shaft oscillations, are familiar to those acquainted with the mechanical arts.

Should the operation to be controlled in response to the cam programming as described, require additional control as for example by intermittent or modulated operations of a switch diagrammatically indicated at 42 in FIG. 3, the switch actuation may be accomplished by providing disc 18 with a peripheral cam surface 43 engaged by a follower 44 carried by reciprocable switch arm or shaft 45.

I claim:

1. A mechanical programming device comprising a support, an extended flexible rubber member mounted in opposed relation to said support and having a cam surface, a follower engaging said surface, and dimensionally variable adjustment means terminally embedded in said rubber member and engaged with said support, said means being mounted and adjustable to flex said cam surface to different configurations by force transmissions along fixed lines of force to the embedded terminals of said means.

2. A programming device according to claim 1, in which said means comprises threaded inserts embedded in the rubber member and adjustable screws threaded into said inserts.

3. A programming device according to claim 1, in which said rubber member is in annular form.

4. A programming device according to claim 2, in which said rubber member is in annular form having a continuous cam surface.

5. A programming device according to claim 3, including also means for rotating said support and rubber member.

6. A mechanical programming device comprising a support, a flexible rubber annulus mounted in opposed spaced relation to said support and having a cam surface engageable by a follower, and a circular series of parallel adjustment means terminally embedded in said annulus and engaged with said support, said means being individually adjustable to flex the annulus relative to the support and along fixed parallel lines of force transmission to thereby vary the shape of said cam surface.

7. A device according to claim 6, comprising also a follower engaging said cam surface, and means for producing relative bodily rotation of said annulus and follower.

8. A device according to claim 6, in which said annulus and support are vertically axially alined, and including a shaft in axial alinement with and rotatably driving said support.

9. A mechanical programming device comprising a horizontally disposed support, a flexible rubber annulus below and in spaced axial alinement with the support, a shaft extending vertically axially of the annulus and rotatably driving said support, said annulus having bottom cam surface, a follower engaging said surface, and a circular series of adjustments interconnecting said annulus and support, each adjustment comprising a threaded insert embedded in the annulus and a vertical screw extending through the support and threaded into said insert, each screw being adjustable to raise or lower its respective insert to correspondingly alter the shape of said cam surface.

10. A device according to claim 9, comprising means for bodily raising or lowering said support and annulus.

References Cited by the Examiner
UNITED STATES PATENTS

| | | | |
|---|---|---|---|
| 2,429,084 | 10/1947 | Woodson | 74—568 |
| 2,497,773 | 3/1950 | Horowitz | 74—568 |
| 2,810,435 | 10/1957 | Demi et al. | 74—568 X |
| 2,845,808 | 8/1958 | Stover | 74—568 |

FRED C. MATTERN, JR., *Primary Examiner.*

W. S. RATLIFF, *Assistant Examiner.*